US010067595B2

(12) United States Patent
Jeong et al.

(10) Patent No.: US 10,067,595 B2
(45) Date of Patent: Sep. 4, 2018

(54) DISPLAY DRIVER INTEGRATED CIRCUIT AND ELECTRONIC APPARATUS INCLUDING THE SAME

(71) Applicant: Samsung Electronics Co., Ltd., Suwon-si, Gyeonggi-do (KR)

(72) Inventors: Eui-hyuk Jeong, Hwaseong-si (KR); Si-woo Kim, Suwon-si (KR); Jeong-pyo Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 15 days.

(21) Appl. No.: 15/160,310

(22) Filed: May 20, 2016

(65) Prior Publication Data

US 2017/0038894 A1  Feb. 9, 2017

(30) Foreign Application Priority Data

Aug. 7, 2015 (KR) .................. 10-2015-0111638

(51) Int. Cl.
| | |
|---|---|
| *G06F 3/038* | (2013.01) |
| *G06F 3/041* | (2006.01) |
| *G06F 1/32* | (2006.01) |
| *G09G 3/20* | (2006.01) |

(52) U.S. Cl.
CPC .......... *G06F 3/0416* (2013.01); *G06F 1/3265* (2013.01); *G06F 3/0412* (2013.01); *G09G 3/20* (2013.01); *Y02D 10/153* (2018.01); *Y02D 50/20* (2018.01)

(58) Field of Classification Search
CPC ..... G09G 2320/0257; G09G 2320/046; G09G 2330/00–2330/12; G09G 2310/0245–2310/0251; G09G 2310/06–2310/08; G06F 3/0412; G06F 3/0416; G06F 1/3265
See application file for complete search history.

(56) References Cited

U.S. PATENT DOCUMENTS

| | | | |
|---|---|---|---|
| 6,927,755 | B2 | 8/2005 | Chang |
| 7,336,269 | B2 | 2/2008 | Huang et al. |
| 8,754,838 | B2 | 6/2014 | Kwon et al. |
| 2001/0030645 | A1* | 10/2001 | Tsutsui ................. G09G 3/3611 345/211 |

(Continued)

FOREIGN PATENT DOCUMENTS

| | | |
|---|---|---|
| JP | 2006-189714 A | 7/2006 |
| JP | 2007-093722 A | 4/2007 |

(Continued)

*Primary Examiner* — Roberto Flores
(74) *Attorney, Agent, or Firm* — Harness, Dickey & Pierce, P.L.C.

(57) ABSTRACT

A display driver integrated circuit (IC) and an electronic apparatus including the same are provided. The display driver IC includes a booster configured to boost an external power supply voltage applied to a first node to a same level as that of an internal power supply voltage, and a power supplier including a power level adjustor configured to activate a current path between a second node and ground in response to a control signal indicating entry into a first mode and form a current path between the first node and the second node when the internal power supply voltage at the second node is equal to a reference voltage.

13 Claims, 13 Drawing Sheets

(56) References Cited

U.S. PATENT DOCUMENTS

| | | | |
|---|---|---|---|
| 2009/0309824 A1* | 12/2009 | Kwon | G09G 3/3677 |
| | | | 345/98 |
| 2011/0115776 A1* | 5/2011 | Yun | H02J 7/0065 |
| | | | 345/212 |
| 2011/0310082 A1* | 12/2011 | Zheng | G02F 1/167 |
| | | | 345/212 |
| 2012/0163034 A1* | 6/2012 | Kim | H02M 3/33523 |
| | | | 363/15 |
| 2013/0076648 A1* | 3/2013 | Krah | G06F 3/0412 |
| | | | 345/173 |
| 2013/0249781 A1 | 9/2013 | Park | |
| 2014/0111497 A1* | 4/2014 | Choi | G09G 5/34 |
| | | | 345/212 |
| 2015/0262540 A1* | 9/2015 | Shi | G09G 3/3648 |
| | | | 345/92 |
| 2016/0189624 A1* | 6/2016 | Jang | G09G 3/3258 |
| | | | 345/213 |
| 2016/0227140 A1* | 8/2016 | Colbeth | H04N 5/32 |

FOREIGN PATENT DOCUMENTS

| | | |
|---|---|---|
| JP | 2009-003207 A | 1/2009 |
| JP | 2012-078492 A | 4/2012 |
| KR | 10-2008-0050039 | 6/2008 |
| KR | 10-0883791 B1 | 2/2009 |

\* cited by examiner

DISPLAY DRIVER INTEGRATED CIRCUIT AND ELECTRONIC APPARATUS INCLUDING THE SAME

CROSS-REFERENCE TO RELATED APPLICATION

This application claims the benefit of Korean Patent Application No. 10-2015-0111638, filed on Aug. 7, 2015, in the Korean Intellectual Property Office, the disclosure of which is incorporated herein in its entirety by reference.

BACKGROUND

Example embodiments of the inventive concepts relate to a display driver integrated circuit (IC) and/or an electronic apparatus including the same.

In order to drive a display panel for displaying high resolution images, an internal power supply voltage may be boosted by using an external power supply voltage applied from a power management integrated circuit (PMIC), and the boosted internal power supply voltage may be used by a display driver to drive the display panel. For example, the display driver may operate in a normal mode to display image data. However, in some cases, when entering a mode other than the normal mode, for example, a power saving mode, such as a standby mode or a low power mode, it may be desirable to discharge the internal power supply voltage to a level of the external power supply voltage. In this case, a potential of a power supply voltage output terminal of the PMIC may momentarily increase, and thus, the PMIC may be damaged by a reverse current occurring due to the momentary increase of the potential. In addition, in the case of an in-cell touch panel, a quick response to a touch may be desired even when the in-cell touch panel operates in a power saving mode.

SUMMARY

Example embodiments of the inventive concepts provide a display driver integrated circuit (IC) and/or an electronic apparatus including the same.

According to some example embodiments of the inventive concepts, the display driver integrated circuit (IC) may include a booster configured to boost an external power supply voltage applied to a first node to a same level as that of an internal power supply voltage, and a power supplier including a power level adjustor configured to activate a current path between a second node and ground in response to a control signal indicating entry into a first mode and form a current path between the first node and the second node when the internal power supply voltage at the second node is equal to a reference voltage.

According to other example embodiments of the inventive concepts, an electronic apparatus may include an in-cell type touch panel including a display pixel and a touch pixel, a display driver integrated circuit (IC) configured to drive the in-cell type touch panel, and a power management IC (PMIC) configured to supply an external power supply voltage to the display driver IC, wherein the display driver IC includes a power supplier configured to activate a current path for connecting a first node to a second node, to which an internal power supply voltage is applied, after activating a current path for connecting the first node, to which the external power supply voltage is applied from the PMIC, to ground when the display driver IC enters a first mode.

Some example embodiments relate to a display driver integrated circuit (IC).

In some example embodiments, the display driver IC includes a booster configured to selectively boost an external voltage applied to a first node to an internal voltage applied to a second node; and a power level adjusting circuit configured to, connect the second node to ground via a first current path to decrease the internal voltage, if the display driver IC enters a low power mode, deactivate the first current path to ground, if the internal voltage reaches a reference voltage, and connect the first node to the second node via a second current path after deactivating the first current path such that the external voltage discharges to a level of the internal voltage.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
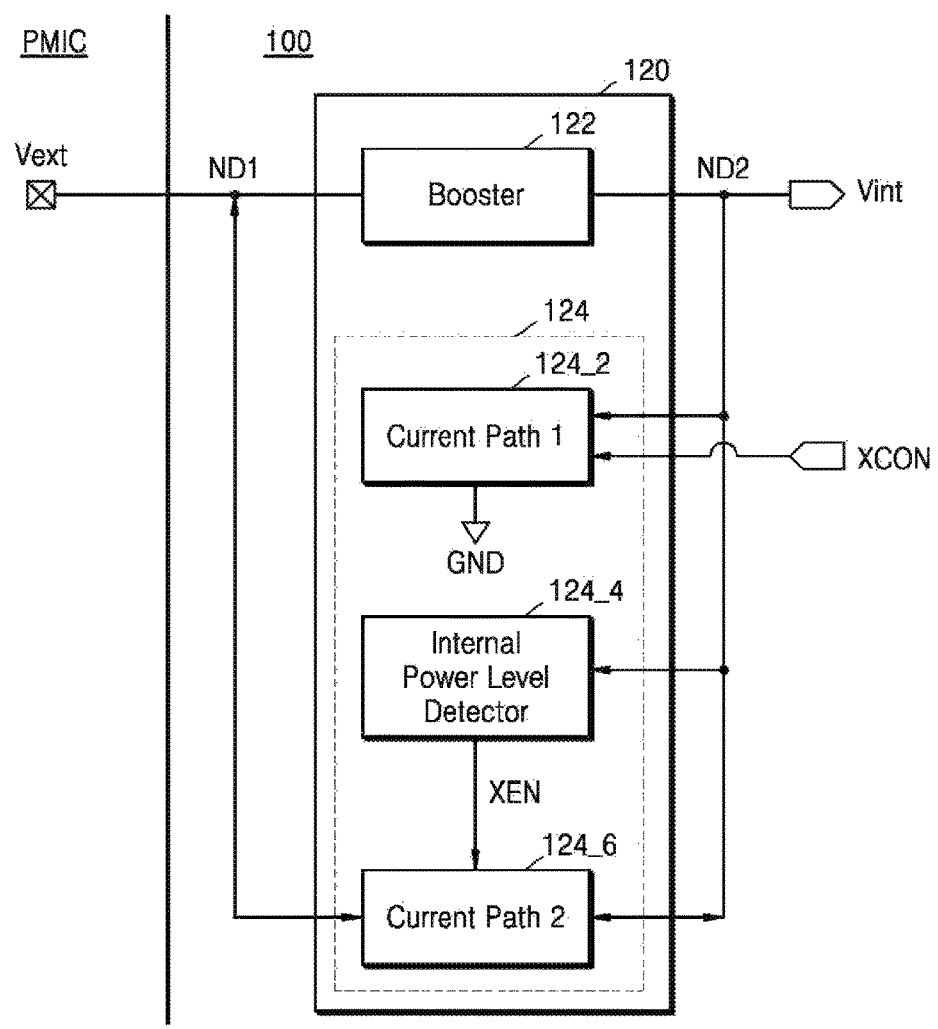
FIG. 1 is a block diagram of a display driver integrated circuit (IC) according to an exemplary embodiment.

Example embodiments of the inventive concepts presented in the present specification are provided to fully convey the inventive concepts to those skilled in the art. The inventive concepts may be embodied in many different forms and should not be construed as limited to the example embodiments set forth herein. It is to be appreciated that all changes, equivalents, and substitutes that do not depart from the spirit and technical scope of the example embodiments are encompassed in the inventive concepts.

Like elements will be rendered the same reference numeral in regard to description of the attached drawings. In the attached drawings, dimensions of structures may be exaggerated or contracted for clear understanding of the inventive concepts.

The terms used in the present specification are merely used to describe particular example embodiments, and are not intended to limit the inventive concepts. An expression used in the singular encompasses the expression of the plural, unless it has a clearly different meaning in the context. In the present specification, it is to be understood that the terms such as "including" or "having," etc., are intended to indicate the existence of the features disclosed in the specification, and are not intended to preclude the possibility that one or more other features may exist or may be added. As used herein, the term "and/or" includes any and all combinations of one or more of the associated listed items. In the present specification, terms such as 'first', 'second', etc. are used to describe various features and used only for distinguishing one feature from another, and the features are not limited by the terms. Thus, when a first feature is described as being connected or coupled to a second feature, a third feature between the first and second features is not precluded.

Unless defined differently, all terms used in the description including technical and scientific terms have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Expressions such as "at least one of," when preceding a list of elements, modify the entire list of elements and do not modify the individual elements of the list.

Hereinafter, example embodiments of the present inventive concepts are described in detail with reference to the accompanying drawings.

FIG. 1 is a block diagram of a display driver integrated circuit (IC) according to an example embodiment.

Referring to FIG. 1, a display driver IC 100 may include a power supplier 120. The power supplier 120 may include a booster 122 and a power level adjustor 124.

The booster 122 boosts an external power supply voltage Vext of a first node ND1 to a same level as that of an internal power supply voltage Vint. The booster 122 may perform a boosting operation by using a charge pumping method. For example, the booster 122 may store energy, for example, in one or more capacitors, to create a higher and/or lower power supply.

For example, the external power supply voltage Vext may be a positive power supply voltage VSP or a negative power supply voltage VSN which is applied from a power management IC PMIC located outside the display driver IC 100. The internal power supply voltage Vint may be a gate high voltage VGH or a gate low voltage VGL, which is used for controlling a gate driver. The gate high voltage VGH may be set to two through three times the positive power supply voltage VSP, and the gate low voltage VGL may be set to two through three times the absolute value of the negative power supply voltage VSN. However, example embodiments are not limited thereto.

The power level adjustor 124 may include a first current path 124_2, an internal power level detector 124_4, and a second current path 124_6.

The power level adjustor 124 may activate the first current path 124_2 to form a current path between a second node ND2 and the ground in response to a control signal XCON, and may discharge the internal power supply voltage Vint via the first current path 124_2 to ground.

The power level adjustor 124 may receive the control signal XCON when the display driver IC 100 enters a mode other than a normal mode, for example, a power saving mode such as a standby mode or a low power mode. The control signal XCON may be generated by an application processor of an electronic apparatus including the display driver IC 100.

The internal power level detector 124_4 detects a voltage level of the internal power supply voltage Vint at the second node ND2. As the first current path 124_2 is activated, the voltage level of the internal power supply voltage Vint at the second node ND2 may change. When the voltage level of the internal power supply voltage Vint is equal to a voltage level of a reference voltage, the internal power level detector 124_4 may transmit an enable signal XEN having a first logic level to the second current path 124_6, and the power level adjuster 124 may deactivate the first current path 124_2.

By activating the second current path 124_6, the internal power level detector 124_4 may form a current path between the second node ND2 and the first node ND1, and thus, the internal power level detector 124_4 may set the voltage level of the internal power supply voltage Vint at the second node ND2 equal to the voltage level of the external power supply voltage Vext.

The first node ND1 is a node to which external power supply voltage Vext is applied from the power management IC PMIC.

Using the power level adjustor 124, the power supplier 120 may selectively bypass the booster 122. For example, by utilizing the second current path 124_6, the power supplier 120 may feedback the internal power supply voltage Vint via the second current path 124_6 without boosting the external power supply voltage Vext, and use the fed back internal power supply voltage Vint as the external power supply voltage Vext.

Figure 2A:
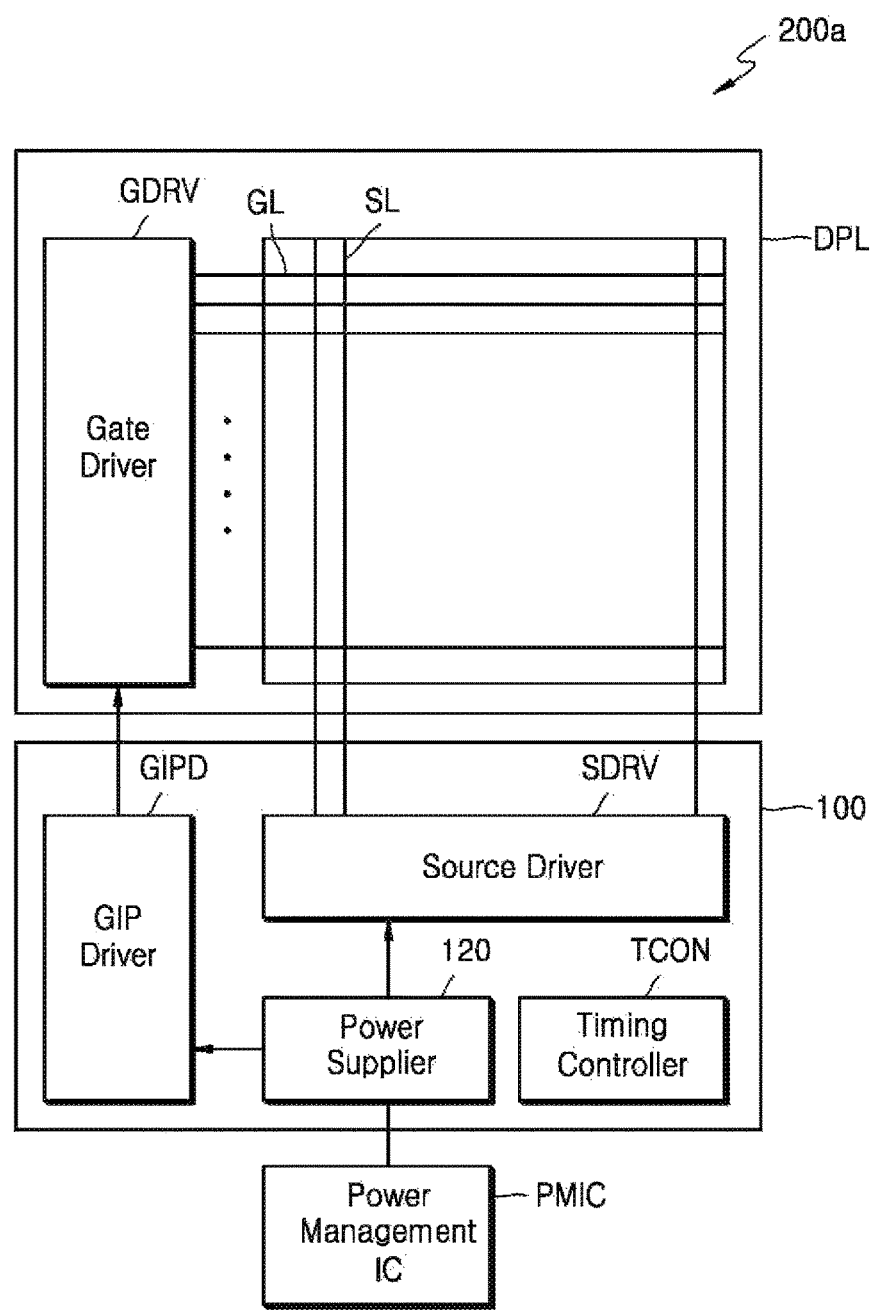
FIGS. 2A and 2B are block diagrams of electronic apparatuses according to example embodiments.
Figure 2B:
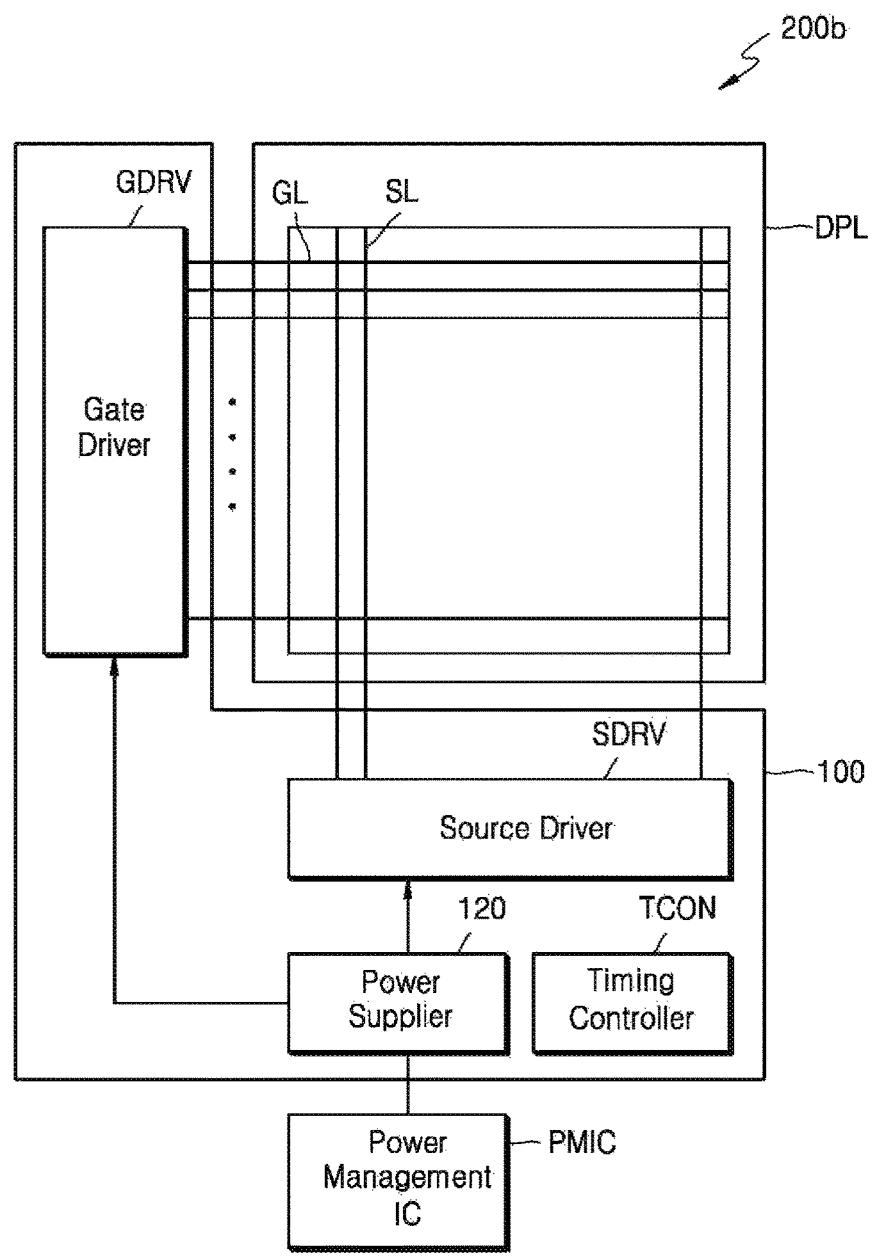

FIGS. 2A and 2B are block diagrams of electronic apparatuses, respectively, according to example embodiments.

Referring to FIGS. 1 and 2A and 2B, electronic apparatuses 200a, 200b may include a display panel DPL, a display driver IC 100, and a power management IC PMIC.

In some example embodiments, as illustrated in FIG. 2A, the display panel DPL may include a gate driver GDRV for driving the gate lines GLm and the display driver IC 100 may include a gate in panel (GIP) driver to provide a voltage and a signal to drive the gate lines GL. However, example embodiments of the inventive concepts are not limited thereto, and the gate driver GDRV may be located outside the display panel DPL.

For example, in other example embodiments, as illustrated in FIG. 2B, the display driver IC 100 may include the gate driver GDRV. Alternatively, the gate driver GDRV may be implemented with a single chip.

The electronic apparatus 200a may be an electronic apparatus having an image display function. For example, the electronic apparatus 200a may include at least one selected from a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device. However, example embodiments are not limited thereto. The wearable device may be a head-mounted-device (FWD) such as electronic glasses, an electronic garment, an electronic bracelet, an electronic necklace, an electronic accessory, an electronic tattoo, or a smart watch. However, example embodiments are not limited thereto.

According to some example embodiments, the electronic apparatus 200a may be a smart home appliance having an image display function. The smart home appliance may include, for example, at least one selected from a television, a digital video disk (DVD) player, an audio device, a refrigerator, an air conditioner, a vacuum cleaner, an oven, a microwave oven, a washing machine, an air purifier, a set-top box, a TV box (for example, Samsung HomeSync™, Apple TV™, or Google TV™), a game console, an electronic dictionary, an electronic key, a camcorder, and an electronic picture frame. However, example embodiments are not limited thereto.

According to some example embodiments, the electronic apparatus 200a may include at least one selected from a medical device (for example, magnetic resonance angiography (MRA), magnetic resonance imaging (MRI), computed tomography (CT), a movie camera, or an ultrasonic device), a navigation device, a global positioning system (GPS) receiver, an event data recorder (EDR), a flight data recorder (FDR), an automotive infotainment device, a marine electronic device (for example, a marine navigation device or a gyro compass), avionics, a security device, an automotive head unit, an industrial or household robot, an automatic teller's machine (ATM), and a point of sales (POS) system. However, example embodiments are not limited thereto.

According to some example embodiments, the electronic apparatus 200a may include at least one selected from furniture having an image display function, a part of a building/structure having an image display function, an electronic board, an electronic signature receiving device, a projector, and a measuring instrument (for example, a water measuring instrument, an electricity measuring instrument, a gas measuring instrument, or a radio wave measuring instrument). An electronic apparatus including a display device according to any of various example embodiments may be one of various devices described above or a combination of one or more of the various devices. In addition, the display device may be a flexible device, but is not limited thereto.

The display panel DPL may include a plurality of pixels arranged in a matrix form and display an image by units of frames. Each pixel is positioned at a point where one of a plurality of gate lines GL arranged in a row direction and one of a plurality of source lines SL arranged in a column direction intersect. The display panel DPL may be implemented with one selected from a liquid crystal display (LCD), a light emitting diode (LED) display, an organic LED (LED) display, an active-matrix OLED (AMOLED) display, an electrochromic display (ECD), a digital mirror device (DMD), an actuated mirror device (AMD), a grating light value (GLV), a plasma display panel (PDP), an electro luminescent display (ELD), and a vacuum fluorescent display (VFD). However, example embodiments are not limited thereto. For example, the display panel DPL may be implemented with another type of flat panel display or flexible display.

The display panel DPL may display image data with resolution that is equal to or higher than that of a wide video graphics array (WVGA) for example, resolution of high definition (HD), resolution of full HD (FHD), or resolution of wide quad HD (WQHD). When displaying image data having resolution that is equal to or higher than that of a WVGA, a capacitance on the display panel DPL may increase. Therefore, as the resolution increases, the current consumption, and thus, the amount of power required may increase. A problem that power efficiency is lowered due to an excessive boosting may be solved by receiving the external power supply voltage Vext from the power management IC PMIC.

The display driver IC 100 may generate a driving signal that is used for displaying an image data applied from the outside on the display panel DPL.

The display driver IC 100 may include a timing controller TCON, a source driver SDRV, a GIP driver GIPD, and the power supplier 120 of FIG. 1.

The display driver IC 100 may be implemented with a single semiconductor chip or a plurality of semiconductor chips.

The timing controller TCON may receive image data and a horizontal synchronization signal, a vertical synchronization signal, a clock signal, and a data enable signal, which are used for driving the image data, from an external device (for example, a host device not shown)), and may control the source driver SDRV and the GIP driver GIPD based on the received signals. Also, the timing controller TCON may change a format of the image data received from the outside so as to be suitable for an interface with the source driver SDRV and provide the image data having the changed format to the source driver SDRV.

The source driver SDRV may use the positive power supply voltage VSP and the negative power supply voltage VSN, which correspond to the external power supply voltage Vext applied from the power management IC PMIC, as a power supply voltage. The source driver SDRV may drive the pixels of the display panel DPL according to the control of the timing controller TCON. The source driver SDRV may supply a gradation voltage corresponding to the image data to the plurality of source lines SL of the display panel DPL.

The GIP driver GIPD may transmit a gate voltage (a gate high voltage VGH and a gate low voltage VGL) to the gate driver GDRV according to the control of the timing controller TCON.

Figure 3:
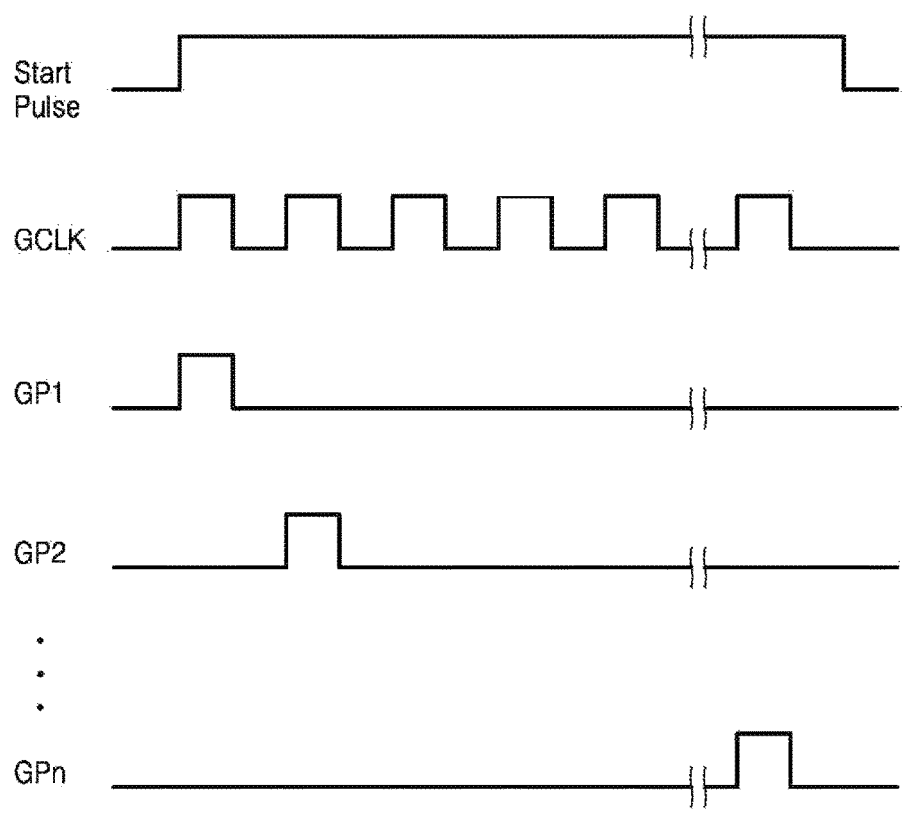
FIG. 3 is an operation timing diagram of a gate driver illustrated in FIGS. 2A and 2B, according to an example embodiment.

FIG. 3 is an operation timing diagram of the gate driver GDRV illustrated in FIGS. 2A and 2B according to an example embodiment.

As shown in FIG. 3, the GIP driver GIPD may transmit a start pulse and a gate clock signal GCLK for controlling an output point in time of each of first through n-th gate on pulses GP1 to GPn (where n is an integer that is equal to or greater than 2) to the gate driver GDRV. The start pulse is a pulse that directs the gate driver GDRV to start an operation of driving the gate lines GL. A signal that is synchronized with each of frames of image data may be used instead of the start pulse in the timing diagram of FIG. 3, and in this case, the gate driver GDRV may identically operate in response to the signal. The gate on pulses GP1 to GPn may be referred to as scan pulses. Each of the gate on pulses GP1 to GPD is a signal indicating a period in which the gate high voltage VGH is applied to a corresponding gate line GL. Each of the gate lines GL is activated while the gate high voltage VHG is applied thereto. For example, the first gate on pulse GP1 may indicate a period in which a gate voltage is applied to a first gate line of the plurality of gate lines GL, and the second gate on pulse GP2 may indicate a period in which a gate voltage is applied to a second gate line of the plurality of gate lines GL. Similarly, the n-th gate on pulse GPn may indicate a period in which a gate voltage is applied to an n-th gate line of the plurality of gate lines GL. In this manner, gate voltages may be respectively sequentially applied to the plurality of gate lines GL by using the gate on pulses GP1 to GPn. However, example embodiments of the inventive concepts are not limited thereto. For example, in some example embodiments, the plurality of gate lines GL are activated regardless of the order of the plurality of gate lines GL. A gate line GL activated by the gate high voltage VGH may be deactivated by the gate low voltage VG.

As shown in the electronic apparatus 200b of FIG. 2B, when the gate driver GDRV is included in the display driver IC 100 located outside the display panel DPL, the display driver IC 100 may not include the GIP driver GIPD. The gate driver GDRV may control the activation of the gate lines GL by using the gate high voltage VGH and the gate low voltage VGL which are applied from the power supplier 120. Hereinafter, for convenience of description, only an example in which the gate driver GDRV has been integrated in the display panel DPL, as shown in the electronic apparatus 200a of FIG. 2A, is described.

As discussed above, the display driver IC 100 may include the power supplier 120 of FIG. 1.

The power supplier 120 may selectively boost, via the booster 122, the external power supply voltage Vext, which is supplied from the power management IC PMIC, to the internal power supply voltage Vint or may bypass the booster 122. For example, as described above, the external power supply voltage Vext may be the positive power supply voltage VSP or the negative power supply voltage VSN. The power supplier 120 may boost the positive power supply voltage VSP or the negative power supply voltage VSN to the gate high voltage VGH or the gate low voltage VGL, and provide the gate high voltage VGH or the gate low voltage VGL to the GIP driver GIPD. Alternatively, the power supplier 120 may bypass the positive power supply voltage VSP or the negative power supply voltage VSN by providing the positive power supply voltage VSP or the negative power supply voltage VSN to the source driver SDRV and/or the GIP driver GIPD without boosting the positive power supply voltage VSP or the negative power supply voltage VSN.

As described above, the power supplier 120 may include the power level adjustor 124, and thus, when entering a power saving mode, the power supplier 120 may direct a current flow to the ground by activating the first current path 124_2 to lower the voltage level of the internal power supply voltage Vint to the voltage level of the reference voltage, and then may connect the internal power supply voltage Vint to the external power supply voltage Vext by activating the second current path 124_6. Accordingly, when the internal power supply voltage Vint is connected to the external power supply voltage Vext when entering the power saving mode, a phenomenon, in which a potential of a terminal of the power management IC PMIC from which the external power supply voltage Vext is output momentarily increases and thus the power management IC PMIC is damaged due to a reverse current, may be prevented. Accordingly, the display driver IC 100 or the electronic apparatus 200a may stably operate.

Although not illustrated in FIGS. 1 to 2B, the display driver IC 100 may further include an interface. The display driver IC 100 may communicate with an external device via the interface. The interface may include one selected from an RGB interface, a central processing unit (CPU) interface, a serial interface, a mobile display digital interface (MDDI), an inter integrated circuit (I2C) interface, a serial peripheral interface (SPI), a micro controller unit (MCU) interface, a mobile industry processor interface (MIPI) an embedded display port (eDP) interface, a D-subminiature (D-sub), an optical interface, and a high definition multimedia interface (HDMI). Additionally or generally, the interface may include, for example, a mobile high-definition link (MHL) interface, a secure digital (SD) card/multi-media card (MMC) interface, or an infrared data association (IrDA) standard interface. Besides, the interface may include any one of various serial or parallel interfaces.

The power management IC PMIC, which is a power supplier for generating a desired (or, alternatively, a predetermined) voltage, may provide a power supply voltage to a plurality of function blocks included in the electronic apparatus 200a. For example, the power management IC PMIC may apply the positive power supply voltage VSP and the negative power supply voltage VSN to the display driver IC 100. As described above, in order for the electronic apparatus 200a to display image data with resolution that is equal to or higher than that of the WVGA, the display driver IC 100 may not directly boost a battery power, but may receive the external power supply voltage Vext from the power management IC PMIC and boost the received external power supply voltage Vext.

Figure 4:
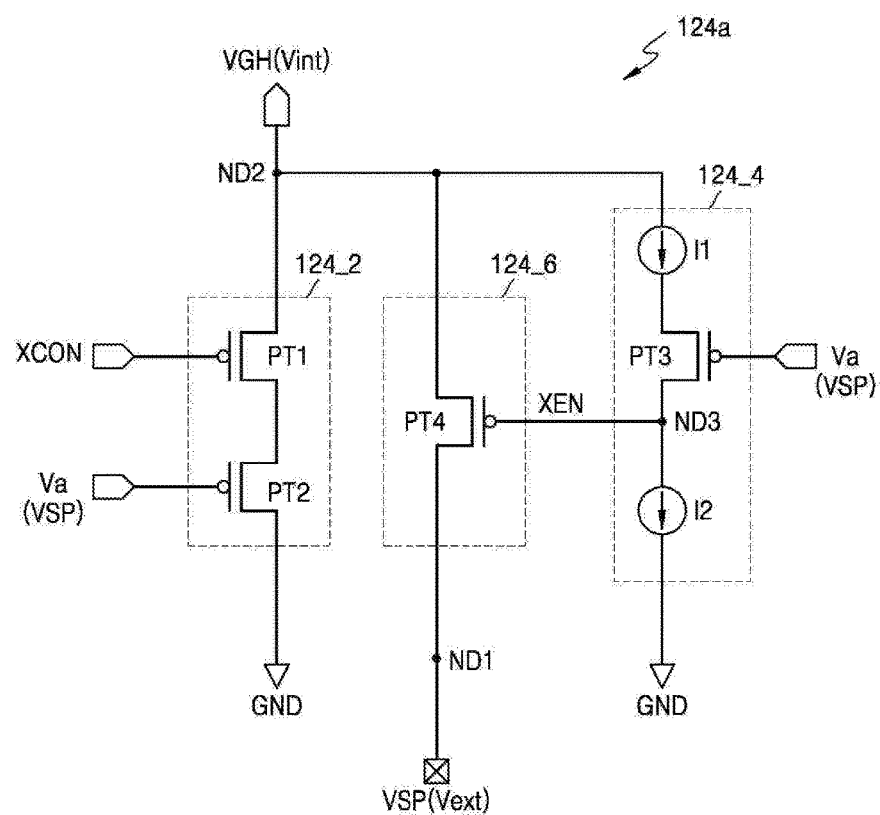
FIG. 4 is a circuit diagram of a power level adjustor according to an example embodiment.
Figure 5:
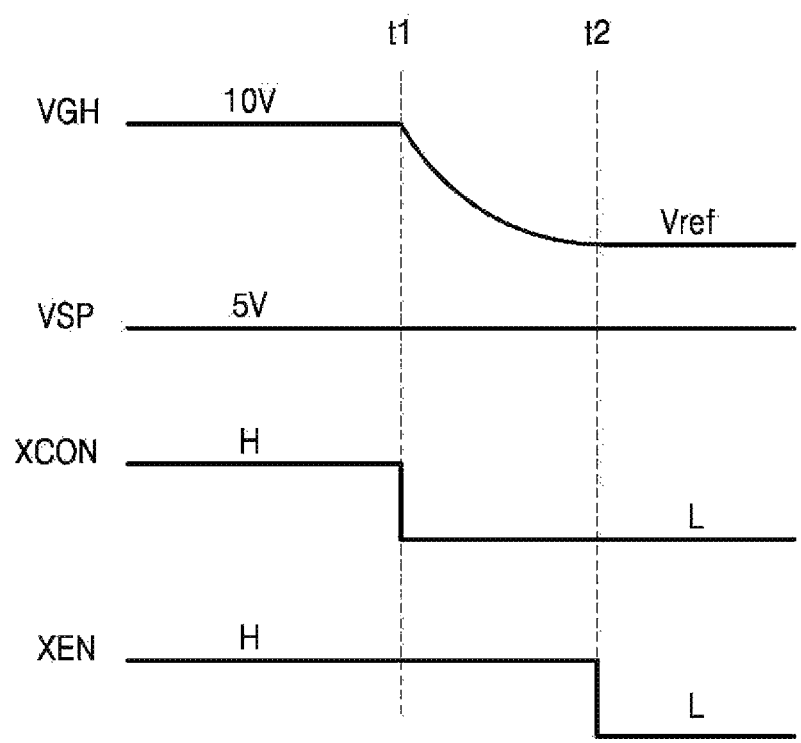
FIG. 5 is a timing diagram for explaining an operation of the power level adjustor of FIG. 4, according to an example embodiment.

FIG. 4 is a circuit diagram of a power level adjustor 124a according to an example embodiment, and FIG. 5 is a timing diagram for explaining an operation of the power level adjustor 124a of FIG. 4.

Referring to FIGS. 1, 4, and 5, in the power level adjustor 124a, a positive power supply voltage VSP is applied to a first node ND1 as an external power supply voltage Vext, and a gate high voltage VGH is applied to a second node ND2 as an internal power supply voltage Vint. In a normal mode, the booster 122 of FIG. 1 boosts the positive power supply voltage VSP to the gate high voltage VGH such that a voltage level of the gate high voltage VGH is higher than the positive power supply voltage VSP. For example, the positive power supply voltage VSP may be 5 volts (V), and the gate high voltage VGH may be 10V.

The power level adjustor 124a may include the first current path 124_2, the internal power level detector 124_4, and the second current path 124_6.

The first current path 124_2 may include a first PMOS transistor PT1 that has one end connected to the second node ND2 and is gated by a control signal XCON, and a second PMOS transistor PT2 that has one end connected to another end of the first PMOS transistor PT1, another end connected to the ground GND, and a gate to which a first voltage Va is applied.

The control signal XCO transitions to a logic low level "L" at time t1 when entering another mode (for example, a power saving mode) from the normal mode. The first PMOS transistor PT1 is turned on in response to the control signal XCON at a logic low level "L". Accordingly, when the control signal XCON at a logic low level "L" is applied, the power level adjuster 124a enables the first PMOS transistor PT1 such that a current flows from the second node ND2 to the ground GND. Accordingly, a voltage level of the gate high voltage VGH at the second node ND2 is lowered.

As the power level adjuster 124a reduces the voltage level of the gate high voltage VGH, the voltage level of the gate high voltage VGH may reach a reference voltage Vref while being reduced. The first voltage Va that is applied to the gate of the second PMOS transistor PT2 may be set to a voltage level that is equal to the voltage level of the positive power supply voltage VSP. The reference voltage Vref may be a voltage that is higher than the positive power supply voltage VSP by a threshold voltage of the second PMOS transistor PT2. In this case, when the gate high voltage VGH is equal to the reference voltage Vref at time t2, a current path to the ground GND is blocked.

The internal power level detector 124_4 detects a level of the internal power supply voltage Vint at the second node ND2. The internal power level detector 124_4 may include a first current source I1, a third PMOS transistor PT3 connected between the first current source I1 and a third node ND3, and a second current source I2 connected between the third node ND3 and the ground GND. The third PMOS transistor PT3 may have the same size as the second PMOS transistor PT2. Similar to the second PMOS transistor PT2, the first voltage Va that is the positive power supply voltage VSP may be applied to the gate of the third PMOS transistor PT3.

A current that is generated by the first current source I1 is greater than that that is generated by the second current source I2, and thus, in the normal mode, the level of the third node ND3 is maintained at a logic high level "H". When a voltage level of the gate high voltage VGH at the second node ND2 is lowered due to entering of a power saving mode and thus is equal to the reference voltage Vref, a current path from the second node ND2 to the third node ND3 is blocked. Accordingly, the third node ND3 transitions to a logic low level "L". In other words, an enable signal XEN that corresponds to a node voltage of the third node ND3 transitions to a logic low level "L".

The second current path 124_6 may include a fourth PMOS transistor PT4 that is connected to the first node ND1 and the second node ND2 and is gated by the enable signal XEN. The fourth PMOS transistor PT4 forms a current path from the second node ND2 to the first node ND1 in response to the enable signal XEN having a logic low level "L". Accordingly, the gate high voltage VGH of the second node ND2 is discharged to the positive power supply voltage VSP of the first node ND1.

Figure 6:
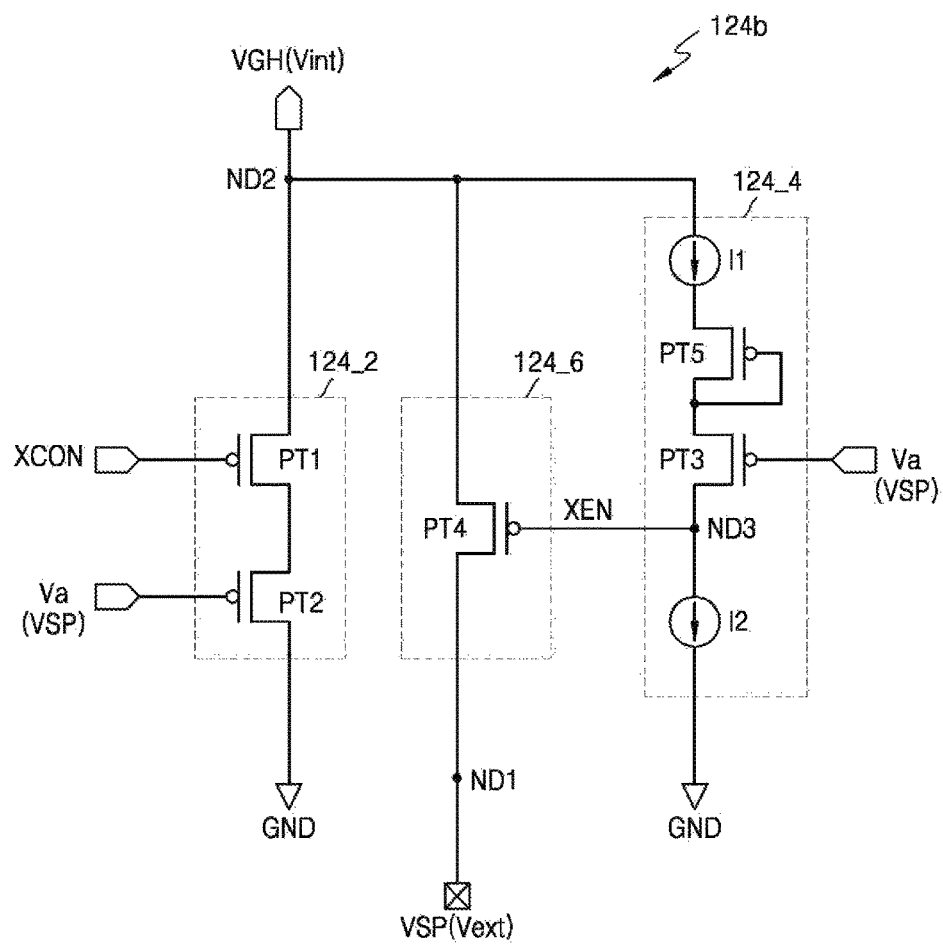
FIG. 6 is a circuit diagram of a power level adjustor according to another example embodiment.

FIG. 6 is a circuit diagram of a power level adjustor 124b according to another example embodiment.

Referring to FIG. 6, the power level adjustor 124b of FIG. 6 may be similar to the power level adjustor 124a of FIG. 4. However, an internal power level detector 124_4 of the power level adjustor 124b of FIG. 6 may further include a fifth PMOS transistor P15 connected between a first current source I1 and a third PMOS transistor PT3.

The gate of the fifth PMOS transistor PT5 and the drain of the fifth PMOS transistor PT5 are connected to each other. The fifth PMOS transistor P15 connected to the third PMOS transistor P13 may adjust a voltage level of the reference voltage Vref to compensate for a mismatch between a second PMOS transistor PT2 and the third PMOS transistor PT3. For example, as the internal power level detector 124_4 further includes the fifth PMOS transistor PT5 connected to the third PMOS transistor PT3, the reference voltage Vref may be set to be higher than a voltage obtained by adding a threshold voltage of the third PMOS transistor PT3 to the first voltage Va.

Figure 7:
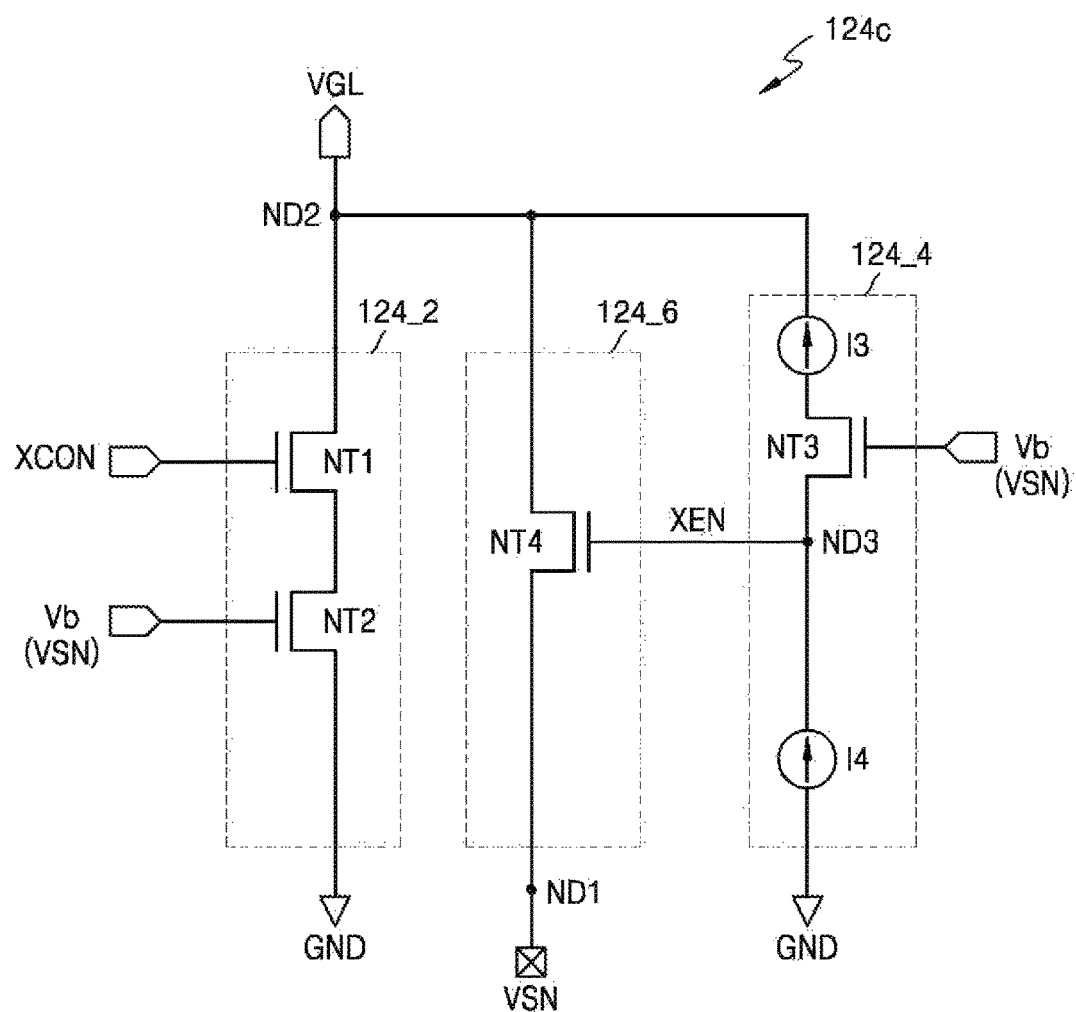
FIG. 7 is a circuit diagram of a power level adjustor according to another example embodiment.
Figure 8:
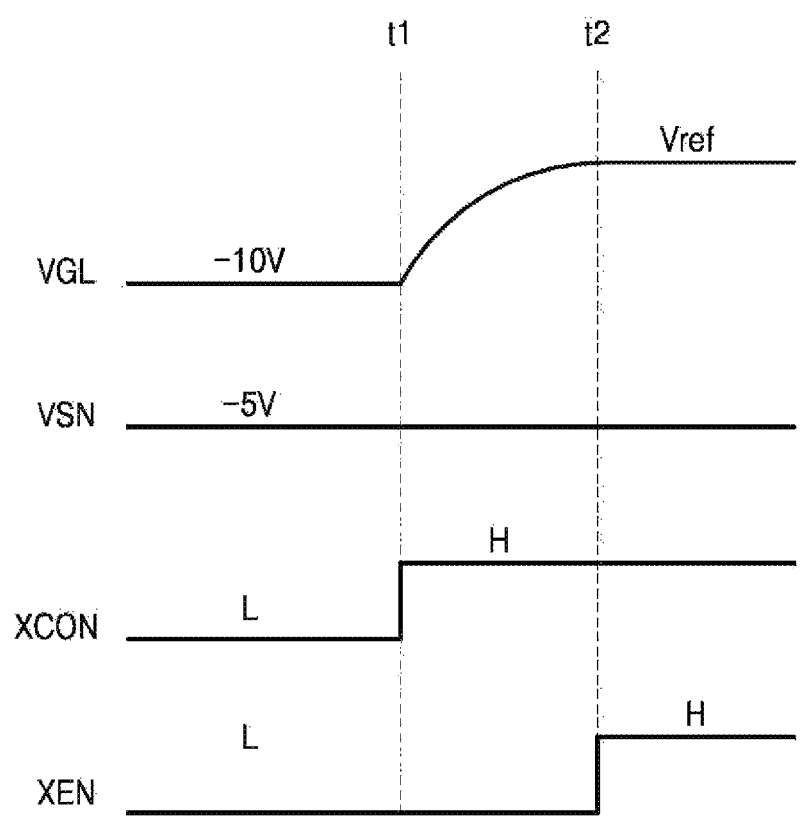
FIG. 8 is a timing diagram for explaining an operation of the power level adjustor of FIG. 7, according to an example embodiment.

FIG. 7 is a circuit diagram of a power level adjustor 124c according to another example embodiment, and FIG. 8 is a timing diagram for explaining an operation of the power level adjustor 124c of FIG. 7.

Referring to FIGS. 1, 7, and 8, in the power level adjustor 124c, a negative power supply voltage VSN is applied to a first node ND1 as an external power supply voltage Vext, and a gate low voltage VGL is applied to a second node ND2 as an internal power supply voltage Vint. In a normal mode, the booster 122 of FIG. 1 boosts the negative power supply voltage VSN to a gate low voltage VGL. The gate low voltage VGL may be boosted to a voltage level that is lower than the negative power supply voltage VSN. For example, the negative power supply voltage VSN may be −5 volts (V), and the gate low voltage VGL may be −10V.

The power level adjustor 124c may include a first current path 124_2, an internal power level detector 124_4, and a second current path 124_6. The first current path 124_2 may include a first NMOS transistor NT1 that has one end connected to the second node ND2 and is gated by a control signal XCON, and a second NMOS transistor NT2 that has one end connected to another end of the first NMOS transistor NT1, another end connected to the ground GND, and a gate to which a second voltage Vb is applied.

The control signal XCO transitions to a logic high level "H" at time t1 upon entering another mode (for example, a power saving mode) from the normal mode. The first NMOS transistor NT1 is turned on in response to the control signal XCON at a logic high level "H". Accordingly, when the control signal XCON at a logic high level "L" is applied, a current path from the ground GND to the second node ND2 is formed. Accordingly, a voltage level of the gate low voltage VGL at the second node ND2 increases.

A voltage level of the gate low voltage VGL may reach a reference voltage Vref at time t2 while the voltage level of the gate low voltage VGL increases. The second voltage Vb that is applied to the gate of the second NMOS transistor NT2 may be set to a voltage level that is equal to the voltage level of the negative power supply voltage VSN. The reference voltage Vref may be a voltage higher than the negative power supply voltage VSN by a threshold voltage of the second NMOS transistor NT2. In this case, when the gate low voltage VGL is equal to the reference voltage Vref, a current path from the ground GND is blocked.

The internal power level detector 124_4 detects a level of the internal power supply voltage Vint, that is, the gate low voltage VGL, at the second need ND2. The internal power level detector 124_4 may include a third current source I3 connected to the second node ND2, a third NMOS transistor NT3 connected between a third node ND3 and the third current source I3, and a fourth current source I4 connected between the third node ND3 and the ground GND. The third NMOS transistor ND may have the same size as the second NMOS transistor NT2. Similar to the second NMOS transistor NT2, the second voltage Vb that is the negative power supply voltage VSN may be applied to the gate of the third NMOS transistor NT3.

A current that is generated by the third current source I3 is less than that that is generated by the fourth current source I4, and thus, in the normal mode, the level of the third node ND3 is maintained at a logic low level "L". When a voltage level of the gate low voltage VGL at the second node ND2 increases due to entering of a power saving mode and is equal to the reference voltage Vref, a current path between the third node ND3 and the ground GND is blocked. Accordingly, the third node ND3 transitions to a logic high level "H". In other words, an enable signal XEN that corresponds to a node voltage of the third node ND3 transitions to a logic high level "H" at time t2.

In FIG. 7, although the internal power level detector 124_4 detects a voltage level of the gate low voltage VGL at the second node ND2 via the current path between the third node ND3 and the ground GND, example embodiments of the inventive concepts are not limited thereto.

Figure 9:
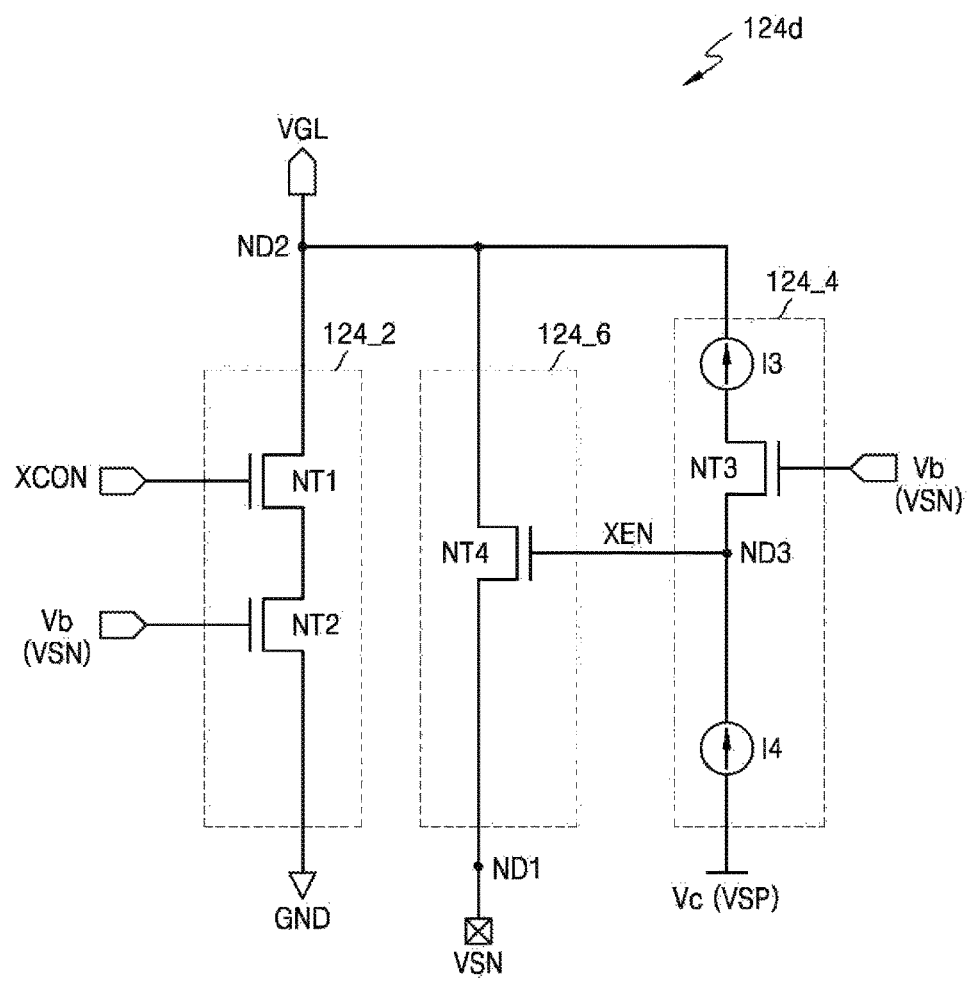
FIG. 9 is a circuit diagram of a power level adjustor according to another example embodiment.

For example, in a power level adjustor 124d of FIG. 9, an internal power level detector 124_4 may detect a voltage level of a gate low voltage VGL at the second node ND2 via a current path between a third voltage Vc, which is not the ground GND, and the third node ND3. The third voltage Vc may be set to one of various voltage levels, such as the positive power supply voltage VSP.

The second current path 124_6 may include a fourth NMOS transistor NT4 that is connected to the first node ND1 and the second node ND2 and is gated by the enable signal XEN. The fourth NMOS transistor NT4 forms a current path from the first node ND1 to the second node ND2 in response to the enable signal XEN having a logic high level "H". Accordingly, the gate low voltage VGH of the second node ND2 is discharged to a same level as that of the negative power supply voltage VSN of the first node ND1.

As discussed above, the power level adjuster 124 may have various structures for discharging stably and efficiently the gate high voltage VGH or the gate low voltage VGL, which is the internal power supply voltage Vint for the driving of the gate lines GL, to a same level as that of the positive power supply voltage VSP or the negative power supply voltage VSN, which is the external power supply voltage Vext, in a mode other than the normal mode in the display driver IC 100. Discharging the internal power supply voltage Vint to a same level as that of the external power supply voltage Vext in a mode other than the normal mode in this manner may be for setting the internal power supply voltage Vint to a constant voltage even when a display operation is not performed or preventing a latch-up phenomenon from occurring in a well.

The display driver IC 100 according to the example embodiments may pre-charge the internal power supply voltage Vint to a same level as that of the external power supply voltage Vext as well as performing the above-stated discharge operation. For example, when the display driver IC 100 is powered on, the first current path 124_2 and the internal power level detector 124_4 of the power level adjustor 124a of FIG. 4 may be deactivated and the second current path 124_6 between the first node ND1 and the second node ND2 may be activated, because a voltage level of the second node ND2 is lower than those of the first and third nodes ND1 and ND3, and thus, the gate high voltage VGH may be pre-charged to a same level as that of the positive power supply voltage VSP. In addition, as described below, the internal power supply voltage Vint may be uniformly pre-charged to a same level as that of the external power supply voltage Vext to perform a function that is woken up in a power saving mode (or a lock screen mode) by touching an in-cell type touch panel.

Figure 10:
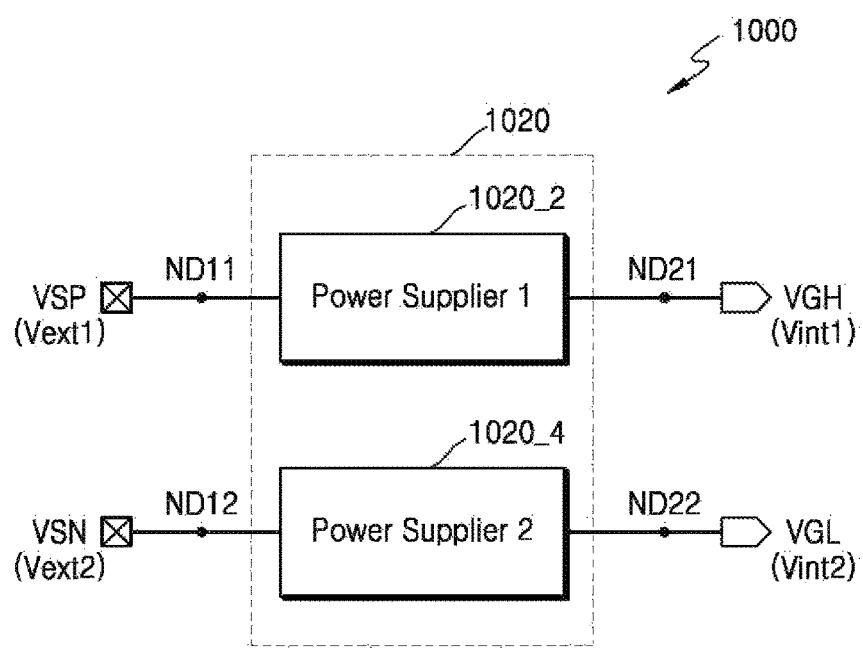
FIG. 10 is a diagram illustrating display driver IC according to another example embodiment.

FIG. 10 is a diagram illustrating a display driver IC 1000 according to another example embodiment.

Referring to FIG. 10, the display driver IC 1000 includes a power supplier 1020. The power supplier 1020 may include a first power supplier 1020_2 and a second power supplier 1020_4.

The first power supplier 1020_2 may selectively boost a positive power supply voltage VSP or bypass a negative power supply VSN. For example, the first power supplier 1020_2 may boost the VSP, which is a first external power supply voltage Vext1 that is applied to a node ND11, to a gate high voltage VGH which is a first internal power supply voltage Vint1, and apply the gate high voltage VGH to a node ND21. Alternatively, the first power supplier 1020_2 may output the negative power supply voltage VSN as the gate high voltage VGH, which is the first internal power supply voltage Vint1, without modulating the negative power supply voltage VSN that is a first external power supply voltage Vext1 that is applied to the node ND11. In addition, the first power supplier 1020_2 may pre-charge the gate high voltage VGH to a same level as that of a positive power supply voltage VSP. The first power supplier 1020_2 may include the power level adjustor 124a of FIG. 4.

The second power supplier 1020_4 may selectively boost a negative power supply voltage VSN or bypass a positive power supply VSP. For example, the second power supplier 1020_4 may boost the positive power supply VSP, which is a second external power supply voltage Vext2 that is applied to a node ND12, to a gate low voltage VGL which is a second internal power supply voltage Vint2, and apply the gate low voltage VGL to a node ND22. Alternatively, the second power supplier 1020_4 may output a positive power supply voltage VSP as the gate low voltage VGL, which is the second internal power supply voltage Vint2, without modulating the positive power supply voltage VSP that is a second external power supply voltage Vext2 that is applied to the node ND12. In addition, the second power supplier 1020_4 may pre-charge the gate low voltage VGL to a same level as that of a negative power supply voltage VSN. The second power supplier 1020_4 may include the power level adjustor 124c of FIG. 7.

Figure 11A:
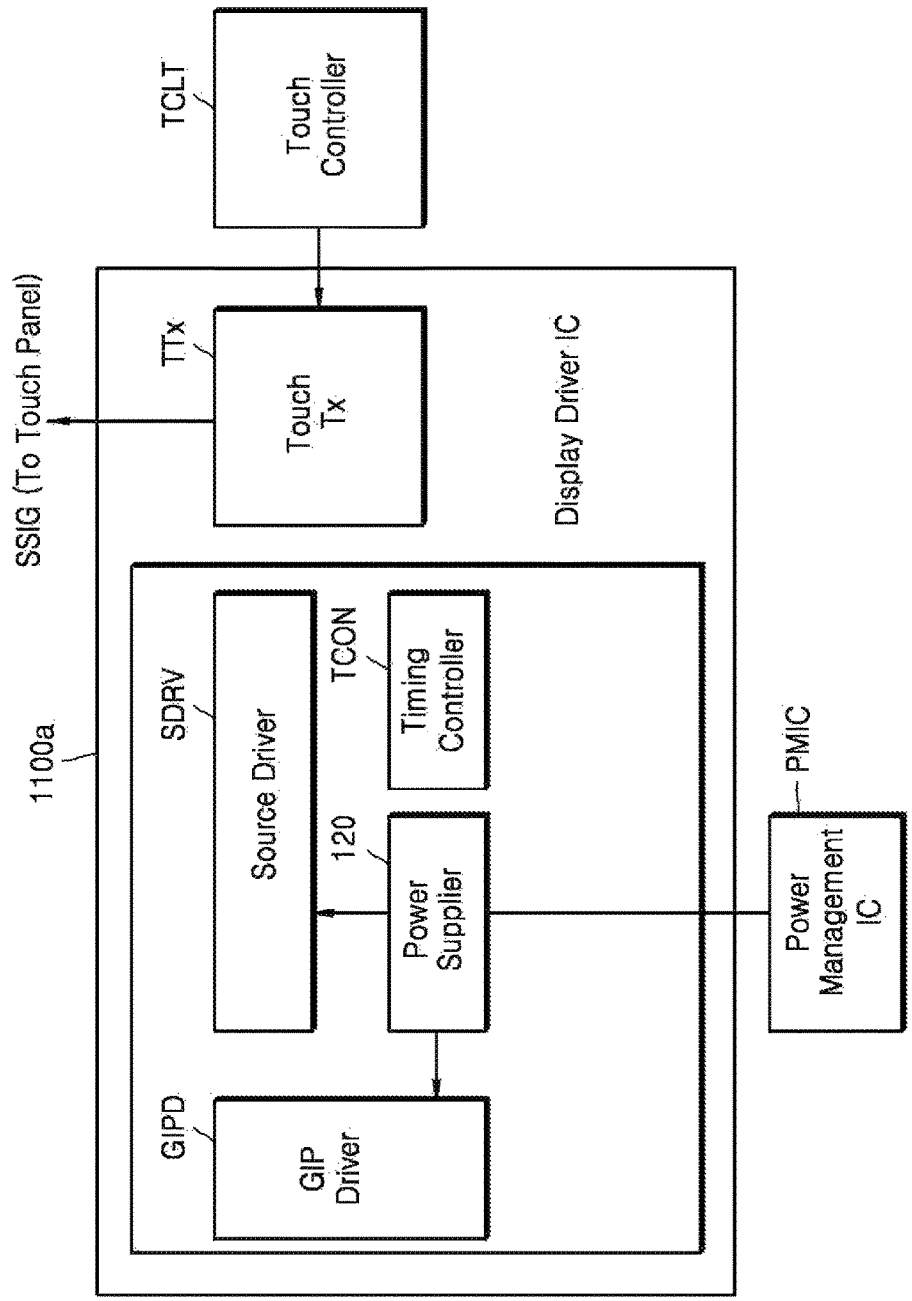
FIG. 11A is a block diagram of a display driver IC according to another example embodiment.
Figure 11B:
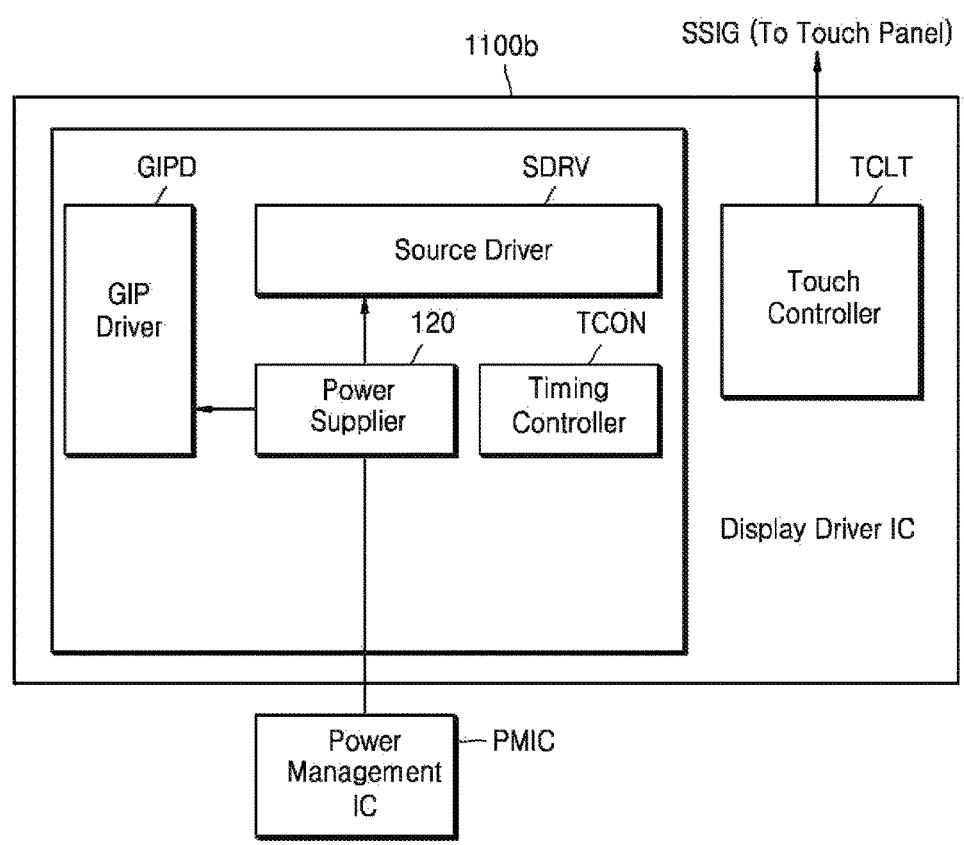
FIG. 11B is a block diagram of a display driver IC according to another example embodiment.

FIG. 11A is a block diagram of a display driver IC 1100a according to another example embodiment, and FIG. 11B is a block diagram of a display driver IC 1100b according to another example embodiment.

Referring to FIG. 11A, the display driver IC 11100a may include a timing controller TCON, a source driver SDRV, a gate in panel (GIP) driver GPD, and a power supplier 120 to drive image data. The timing controller TCON, the source driver SDRV, the GIP driver GIPD, and the power supplier 120, illustrated in FIG. HA, are the same as the timing controller TCON, the source driver SDRV, the GIP driver GEM, and the power supplier 120, respectively, illustrated in FIG. 2A, and thus, detailed descriptions thereof are not omitted.

The display driver IC 1100a of FIG. 11A may include some of functions of a touch controller TCTL. For example, the display driver IC 1100a may further include a touch transmitter TTx that outputs a scan signal SSIG to sense a touch on a touch panel. The touch transmitter TTx may output the scan signal SSIG that is used for sensing a touch and a touch position according to the control of the touch controller TCTL that is located outside the display driver IC 1100a. The touch controller TCTL may convert an electrical change sensed by using the scan signal SSIG transmitted from the touch transmitter TTx into touch coordinates and transmit the touch coordinates to a host (not shown).

When a touch panel is an in-cell type touch panel and includes pixels for display and pixels for touch sensing, the display driver IC 11100a may be implemented as shown in FIG. 11A. The touch panel may be formed by patterning an electrode on a glass substrate or a polyethylene terephthlate (PET) film by using a transparent electrode formed of a material such as indium tin oxide (ITO).

As illustrated in FIG. 11B, a display driver IC 1100b for driving an in-cell type touch panel may include a touch controller TCTL. In this manner, the display driver ICs 1100a and 1100b for driving in-cell type touch panels may periodically apply the scan signal SSIG to a touch panel to sense a touch in real time even if the touch panel does not operate in a normal mode, and to this end, an internal power supply voltage (for example, the gate high voltage VGH or the gate low voltage VGL) may be used. Accordingly, in order to quickly sense a wake-up in a power saving mode (or a lock screen mode) by touching an in-cell type touch panel, a pre-charge voltage may be maintained to constant external power supply voltage Vext. The external power supply voltage Vext may be pre-charged to a same level as that of the internal power supply voltage Vint, and an external power supply voltage pre-charged to a same level as that of the internal power supply voltage Vint may be used. As the display driver ICs 1100a and 1100b includes the power supplier 124a of FIG. 4, the display driver ICs 1100a and 1100b may perform a fast, stable, and efficient pre-charge operation.

While example embodiments of the inventive concepts have been particularly shown and described with reference to some example embodiments thereof, it will be understood that various changes in form and details may be made therein without departing from the spirit and scope of the following claims.

What is claimed is:

1. A display driver integrated circuit (IC) comprising:
   a booster configured to boost an external power supply voltage applied to a first node to a voltage level of an internal power supply voltage applied to a second node, the external power supply voltage being a positive power supply voltage, and the internal power supply voltage being a gate high voltage; and
   a power level adjustor configured to,
      form a current path between the second node and a ground, in response to the display driver IC entering a first mode,
      deactivate the current path between the second node and ground and form a current path between the first node and the second node, in response to the internal power supply voltage at the second node being equal to a reference voltage, wherein
   the power level adjustor includes,
      a first PMOS transistor having a source, a drain and a gate, the source of the first PMOS transistor connected to the second node and the gate of the first PMOS transistor configured to receive a control signal,
      a second PMOS transistor having a source, a drain and a gate, the source of the second PMOS transistor connected to the drain of the first PMOS transistor, the drain of the second PMOS transistor connected to the ground, and the gate of the second PMOS transistor configured to receive a first voltage,
      a first current source connected to the second node, the first current source configured to supply a current having a first current level,
      a third PMOS transistor connected between the first current source and a third node, the third PMOS transistor having a gate configured to receive the first voltage,
      a second current source connected between the third node and the ground, the second current source configured to supply a current having a second current level, the second current level being less than the first current level, and
      a fourth PMOS transistor connected between the first node and the second node, the fourth PMOS transistor having a gate configured to receive an enable signal from the third node.

2. The display driver IC of claim 1, wherein the power level adjustor comprises:
   a first current path configured to electrically connect the second node to the ground, in response to the control signal indicating that the display driver IC has entered the first mode;
   an internal power level detector configured to detect the internal power supply voltage at the second node, and selectively output the enable signal based on the detected internal power supply voltage and the reference voltage; and
   a second current path configured to electrically connect the first node to the second node, in response to the internal power level detector outputting the enable signal.

3. The display driver IC of claim 2, wherein the first voltage is the positive power supply voltage, and the reference voltage is greater than the positive power supply voltage by a threshold voltage of the third PMOS transistor.

4. The display driver IC of claim 1, wherein the first mode is an operation mode other than a normal mode for image data processing.

5. An electronic apparatus comprising:
   an in-cell type touch panel including at least one display pixel and at least one touch pixel;
   a power management IC (PMIC) configured to generate an external power supply voltage, and to apply the external power supply voltage to a first node; and
   a display driver integrated circuit (IC) configured to drive the in-cell type touch panel, the display driver IC including a power supplier configured to,
      activate a first current path connecting the first node to ground, in response to the display driver IC entering a first mode,
      deactivate the first current path between the first node and the ground and activate a second current path connecting the first node to a second node after deactivating the first current path in response to an internal power supply voltage at the second node being equal to a reference voltage, the second node having the internal power supply voltage applied thereto, wherein the power supplier includes,
      a first power supplier configured to receive a positive power supply voltage as the external power supply voltage from the PMIC, and to drive gate lines of the in-cell type touch panel by performing boosting, discharging, and pre-charging between the positive power supply voltage and a gate high voltage, the first power supplier including,
         a first PMOS transistor having a source, a drain and a gate, the source of the first PMOS transistor connected to the second node and the gate of the first PMOS transistor configured to receive a control signal indicating that the display driver IC has entered the first mode;
         a second PMOS transistor having a source, a drain and a gate, the source of the second PMOS transistor connected to the drain of the first PMOS transistor, the drain of the second PMOS transistor connected to a ground, and the gate of the second PMOS transistor configured to receive a first voltage;
         a first current source connected to the second node, the first current source configured to supply a current having a first current level;
         a third PMOS transistor connected between the first current source and a third node, the third PMOS transistor having a gate configured to receive the first voltage;
         a second current source connected between the third node and the ground, the second current source configured to supply a current having a second current level, the second current level being less than the first current level; and
         a fourth PMOS transistor connected between the first node and the second node, the fourth PMOS transistor having a gate configured to receive an enable signal from the third node, and a second power supplier configured to receive a negative power supply voltage as the external power supply voltage from the PMIC, and to drive the gate lines of the in-cell type touch panel by performing boosting, discharging, and pre-charging between the negative power supply voltage and a gate low voltage.

6. The electronic apparatus of claim 5, wherein the second power supplier comprises:
a first NMOS transistor having a source, a drain and a gate, the drain of the first NMOS transistor connected to the second node and the gate of the first NMOS transistor configured to receive the control signal indicating that the display driver IC has entered the first mode;
a second NMOS transistor having a source, a drain and a gate, the drain of the second NMOS transistor connected to the source of the first NMOS transistor, the source of the second NMOS transistor connected to the ground, and the gate of the second NMOS transistor configured to receive a second voltage;
a third current source connected to the second node and the third node, the first current source configured to supply a current having a third current level;
a third NMOS transistor connected between the first current source and the third node, a gate of the third NMOS transistor configured to receive the second voltage;
a fourth current source connected between the third NMOS transistor and the ground, the second current source configured to supply a current having a fourth current level, the fourth current level being greater than the third current level; and
a fourth NMOS transistor connected between the first node and the second node, the fourth NMOS transistor having a gate configured to receive the enable signal from the third node.

7. The electronic apparatus of claim 5, wherein the in-cell type touch panel comprises:
a gate driver configured to control activation of gate lines of the in-cell type touch panel via the internal power supply voltage.

8. The electronic apparatus of claim 5, wherein the display driver IC is further configured to transmit a scan signal to the in-cell type touch panel to sense a touch position on the in-cell type touch panel.

9. A display driver integrated circuit (IC) comprising:
a booster configured to selectively boost an external voltage applied to a first node to an internal voltage applied to a second node, the external voltage being a positive voltage, and the internal voltage being a gate high voltage; and
a power level adjusting circuit configured to,
connect the second node to ground via a first current path to decrease the internal voltage down to a reference voltage, in response to the display driver IC entering a low power mode,
deactivate the first current path to ground, in response to the internal voltage reaching the reference voltage after connecting the second node to the ground in the low power mode, and
connect the first node to the second node via a second current path after deactivating the first current path such that the internal voltage further discharges from the reference voltage to a level of the external voltage, wherein the power level adjusting circuit includes,
a first PMOS transistor having a source, a drain and a gate, the source of the first PMOS transistor connected to the second node and the gate of the first PMOS transistor configured to receive a control signal,
a second PMOS transistor having a source, a drain and a gate, the source of the second PMOS transistor connected to the drain of the first PMOS transistor, the drain of the second PMOS transistor connected to the ground, and the gate of the second PMOS transistor configured to receive a first voltage,
a first current source connected to the second node, the first current source configured to supply a current having a first current level,
a third PMOS transistor connected between the first current source and a third node, the third PMOS transistor having a gate configured to receive the first voltage,
a second current source connected between the third node and the ground, the second current source configured to supply a current having a second current level, the second current level being less than the first current level, and
a fourth PMOS transistor connected between the first node and the second node, the fourth PMOS transistor having a gate configured to receive an enable signal from the third node.

10. The display driver IC of claim 9, wherein, in response to the display driver IC entering the low power mode, the power level adjusting circuit is configured to bypass the booster by connecting the first node to the second node via the second current path after deactivating the first current path.

11. The display driver IC of claim 9, wherein the power level adjusting circuit comprises:
a detector configured to,
detect the internal voltage at the second node, and
activate the second current path based on the internal voltage and the reference voltage.

12. The display driver IC of claim 9, wherein the reference voltage is one of greater than the external voltage by a threshold voltage of a transistor within one of the first current path and the second current path and less than the external voltage by the threshold voltage of the transistor.

13. The display driver IC of claim 9, wherein the display driver IC is configured to,
receive the external voltage from an output terminal of a power management IC (PMIC) connected to the first node,
drive gate lines of a touch panel via the internal voltage, and
prevent a momentary increase in a potential of the output terminal when the first node is connected to the second node by discharging the internal voltage to a same level as the external voltage in two-stages, in response to the display driver IC entering the low power mode.

\* \* \* \* \*